United States Patent [19]

Crookham et al.

[11] Patent Number: 4,890,361
[45] Date of Patent: Jan. 2, 1990

[54] TELEPHONE CORD STRAIGHTENER

[75] Inventors: Carter C. Crookham, 10888 N. 70th St., Scottsdale, Ariz. 85254; Bernard W. Shonka, Scottsdale, Ariz.

[73] Assignee: Carter C. Crookham, Scottsdale, Ariz.

[21] Appl. No.: 268,794

[22] Filed: Nov. 7, 1988

[51] Int. Cl.⁴ ............................................. F16G 11/00
[52] U.S. Cl. ................................ 24/129 R; 24/129 D; 379/441
[58] Field of Search ............ 24/129 R, 129 A, 129 D, 24/115 H; 379/441; 174/135

[56] References Cited

U.S. PATENT DOCUMENTS

| | | | |
|---|---|---|---|
| 1,578,817 | 3/1926 | Fischer | 24/129 A |
| 1,916,937 | 7/1933 | Schlaburg | 24/129 A |
| 1,943,136 | 1/1934 | Moser | 24/129 R |
| 2,015,403 | 9/1935 | Kiddle | 174/135 |
| 2,015,404 | 9/1935 | Kiddle | 24/129 D |
| 2,832,116 | 4/1958 | Clevett, Jr. et al. | 24/129 D |
| 3,721,750 | 3/1973 | Countryman | 174/135 |
| 4,109,603 | 8/1978 | Guthmann | 114/218 |
| 4,357,500 | 11/1982 | Nilsen | 379/441 |

FOREIGN PATENT DOCUMENTS

| | | | |
|---|---|---|---|
| 243675 | 3/1965 | Austria | 24/115 H |
| 570769 | 2/1959 | Canada | 24/129 R |

Primary Examiner—Victor N. Sakran
Attorney, Agent, or Firm—Zarley, McKee, Thomte, Voorhees & Sease

[57] ABSTRACT

A free-floating anchor sleeve is positioned on a telephone cord between the base unit and handset of a telephone. The weight of the straightener causes it to always find the low spot in the cord and thereby keep tension on each of the lengths of cord thereby keeping them separated and untangled. The straightener may be cylindrical or multi-sided in shape.

5 Claims, 1 Drawing Sheet

U.S. Patent
Jan. 2, 1990
4,890,361
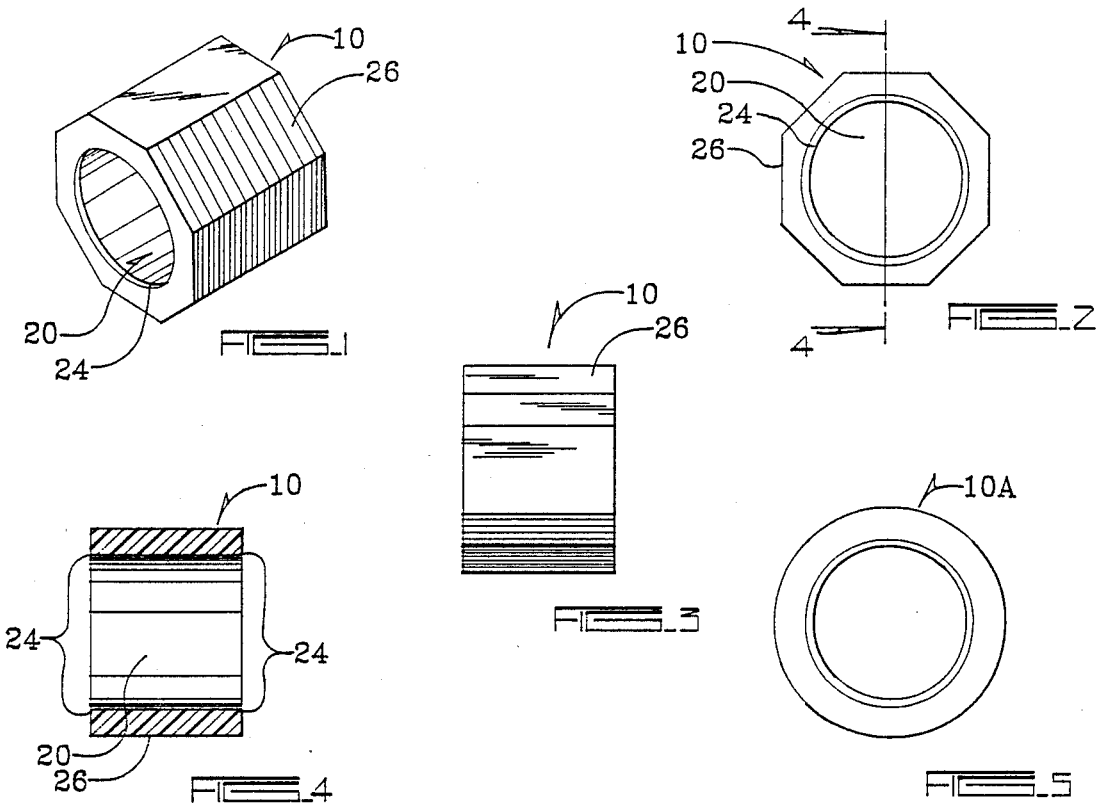
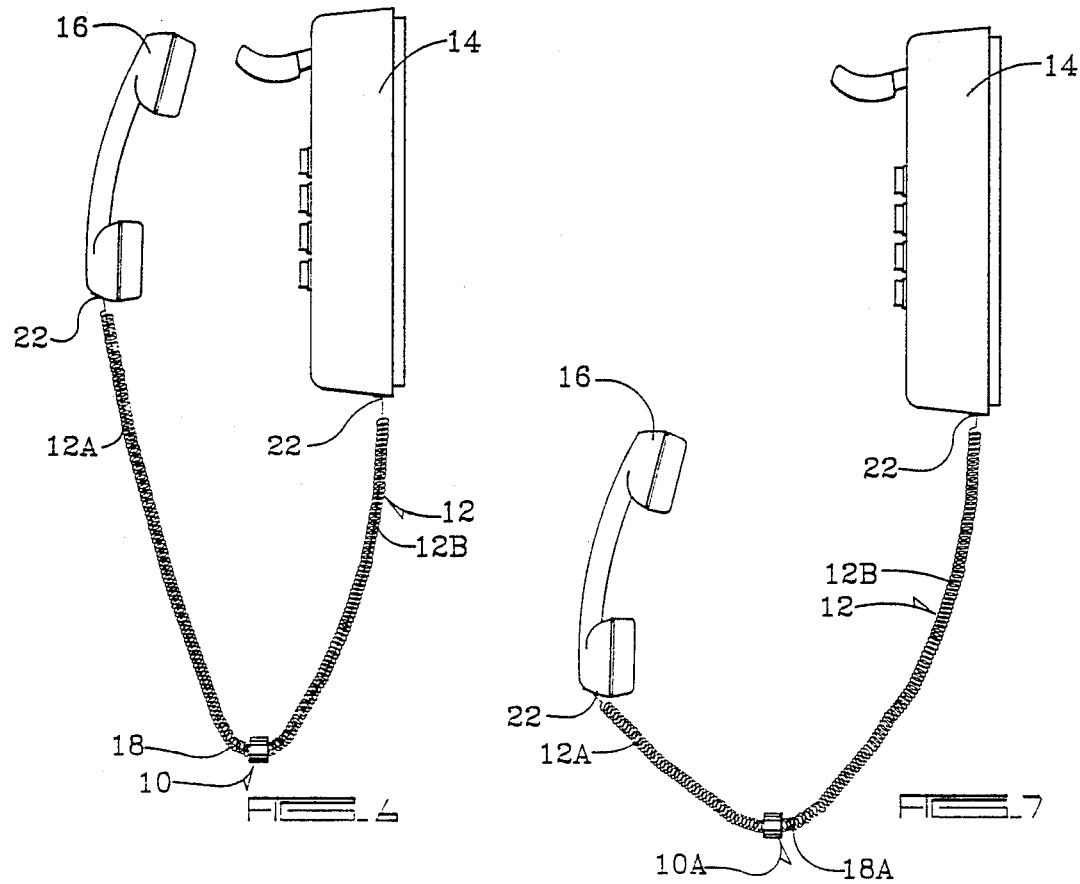

TELEPHONE CORD STRAIGHTENER

BACKGROUND OF THE INVENTION

The telephone cord extending between the phone base unit and handset is ordinarily a coiled-type cord. The problem with these cords, particularly the longer ones, is that they can easily become tangled. This occurs for a variety of reasons including the fact that the coils become spread apart and then tend to intermesh in the tangled fashion or the handset, through use, inadvertently is rotated about the longitudinal axis of the cord thereby tending to twist the cord.

Several devices have been used on cords for a variety of purposes and are shown in Patent 2,015,404 and 1,916,937. In the '404 patent, a U-shaped device is shown frictionally held on the cord in a fixed location and thus functions as a spacer tending to keep the two cord sections apart. The device is not free to move in response to gravitational forces.

The '937 patent shows a weighted sphere frictionally positioned on an electrical cord, but it also is not free to move in response to gravitational forces.

Accordingly, what is needed is a telephone cord straightener particularly suited for coiled telephone cords that will freely move along the length and seek its own center or low spot, and through its inherent weight, keep the two lengths of cord separated and thus untangled.

SUMMARY OF THE INVENTION

The telephone cord straightener of this invention is particularly adaptable for use on coiled telephone cords between the phone base unit and the handset. The cord straightener involves a sleeve element large enough to go over the ends of the cord and sufficiently large that it will freely slide along the length of the coils locating itself at the bottom point in the cord no matter where the handset is positioned relative to the base unit. It is expected that during use, the handset may be located relatively low compared to the base unit and at other times held high, and thus the low point in the coiled cord changes with the location of the handset. If the straightener is not free to move as the handset is moved, the coiled cord below the straightener, if locked onto the cord, would be unaffected by the weight of the straightener and thus not perform the function of keeping the cord sections from tangling.

The length of the straightener is also sufficient to space the cord sections apart and further deter their interengagement. The straightener may be of plastic material and be either cylindrical or multi-sided in shape. A flat side on the exterior of the straightener allows for it to rest on a flat surface, such as a counter table.

DESCRIPTION OF THE DRAWINGS

FIG. 1 is a perspective view of the telephone straightener of this invention.

FIG. 2 is an end elevational view thereof.

FIG. 3 is a side elevational view thereof.

FIG. 4 is a cross-sectional view taken along line 4—4 in FIG. 2.

FIG. 5 is an end elevational view of a cylindrical embodiment.

FIG. 6 is a side elevational view of a telephone base unit and handset having the cord straightener on the coiled cord.

FIG. 7 is a view similar to FIG. 6 but showing the cord straightener having moved in response to the forces of gravity due to the handset being located relatively lower.

DESCRIPTION OF THE PREFERRED EMBODIMENT

The cord straightener of this invention is referred to generally in FIG. 1 by the reference numeral 10. In FIGS. 6 and 7, the cord straightener 10 is seen mounted on a coiled telephone cord 12 extending from a base unit 14 to a handset 16. The straightener is free to float along the length of the cord 12 and function as a floating anchor or ballast seeking the low spot 18 in the cord. In FIG. 7, it is seen that the low spot 18A is different from that in FIG. 6 due to the handset 16 having been moved lower relative to the base unit 14. The cord 12 thus has two portions 12A and 12B. In FIG. 6, the portion 12A is longer than the section 12B, while the reverse is true in FIG. 7.

The straightener 10 has a cylindrical passageway 20 through which the coiled cord 12 extends. The cord may be either a ⅜" or 7/16" size. The passageway 20 is large enough to allow the plug modules 22 to pass therethrough such that the straightener can be mounted on the cord. The internal diameter of the passageway may be one inch while the external diameter is 1¼". The length may be one inch also. The passageway end edges 24 are rounded to allow the straightener to freely float along the length of the cord.

The straightener as seen in FIGS. 1–4 is octagonal in shape, and thus includes eight flat sides 26. These flat sides allow for the straightener to be stabilized on a flat support surface. Alternatively, the cord straightener 10 may be cylindrical in shape as shown by the cord straightener 10A in FIG. 5.

It is thus seen that the cord straightener of this invention may be easily installed on the modern-day coiled cord extending between the base unit and handset of a telephone due to its free-floating anchor characteristics which substantially keep the cord from becoming tangled. The lengths of the cord 12A and 12B will be separated to a degree by the length of the straightener 10 and the fact that the straightener 10 is always at the lowest spot in the cords length will assure that each of the cord lengths 12A and 12B are kept taut, and when they are taut, they are much less likely to become tangled with each other. Without the cord straightener of this invention, tangling is a particular problem with coil-type cords which have become stretched out through use.

What is claimed is:

1. A telephone and cord straightener in combination comprising,
    a phone base unit having a coiled cord extending therefrom and a handset on the outer end of said coiled cord, said cord having an outside diameter,
    an integral elongated floating anchor sleeve on said coiled cord and having a straight cylindrical passageway therethrough, with open opposite ends said passageway having a smooth continuous inside surface and an inside diameter sufficiently larger than the outside diameter of said cord that said anchor sleeve freely moves by gravity along the length of said cord and seeks the low spot in the cord between the base unit and the handset thereby keeping the cord on opposite sides of said anchor taut and from interengaging and becoming twisted and tangled.

2. The structure of claim 1 wherein said sleeve is cylindrical in shape.

3. The structure of claim 2 wherein said sleeve is made of plastic.

4. The structure of claim 1 wherein said sleeve is multi-sided around its outer periphery.

5. The structure of claim 4 wherein at least one of said sides is flat and adapted to sit stationary on a flat support.

* * * * *